(12) United States Patent
Lienemann

(10) Patent No.: US 6,951,189 B1
(45) Date of Patent: *Oct. 4, 2005

(54) HAY SAVER INSERT

(75) Inventor: Trevor L. Lienemann, Princeton, NE (US)

(73) Assignee: Plymouth Industries, LLC, Plymouth, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/928,772

(22) Filed: Aug. 27, 2004

Related U.S. Application Data

(63) Continuation of application No. 10/683,738, filed on Oct. 13, 2003, now Pat. No. 6,789,505, which is a continuation of application No. 10/384,879, filed on Mar. 5, 2003, now Pat. No. 6,672,247.

(51) Int. Cl.$^7$ .............................. A01K 1/10; A01K 5/00
(52) U.S. Cl. .......................................... 119/60; 119/58
(58) Field of Search ............................... 119/51.03, 58, 119/60

(56) References Cited

U.S. PATENT DOCUMENTS

| | | | |
|---|---|---|---|
| 6,672,247 B1 * | 1/2004 | Lienemann | 119/60 |
| 6,789,505 B1 * | 9/2004 | Lienemann | 119/60 |

* cited by examiner

Primary Examiner—Teri Pham Luu
Assistant Examiner—Elizabeth Shaw
(74) Attorney, Agent, or Firm—Thomte, Mazour & Niebergall; Dennis L. Thomte

(57) ABSTRACT

A hay saver insert is adapted to be removably positioned on and within a conventional cylindrical hay feeder. The insert includes an upper end portion which rests upon the upper end of the conventional feeder and a conical-shaped portion which extends downwardly into the interior of the feeder. Hay is placed within the insert and the animals have access thereto. Hay being pulled from the insert by the animals may fall into the area between the conical-shaped portion of the insert and the interior of the feeder which prevents the hay from being trampled.

20 Claims, 4 Drawing Sheets

HAY SAVER INSERT

CROSS-REFERENCE TO RELATED APPLICATIONS

This is a continuation application of Petitioner's earlier application Ser. No. 10/683,738 filed Oct. 13, 2003, now U.S. Pat. No. 6,789,505 entitled A HAY SAVER INSERT which is a continuation application of Petitioner's earlier application Ser. No. 10/384,879 filed Mar. 5, 2003, entitled A HAY SAVER INSERT, now U.S. Pat. No. 6,672,247.

BACKGROUND OF THE INVENTION

1. Field of the Invention

This invention relates to a hay saver insert and more particularly to a hay saver insert which is inserted into a conventional round or cylindrical bale feeder.

2. Description of the Related Art

Conventional round or cylindrical feeders have been used for many years to feed large round roll-type bales to livestock. Most conventional round bale feeders include a circular metal frame having a plurality of horizontally spaced-apart bars or pipes positioned thereon which enable the animals to insert their heads therethrough to gain access to the hay but which are spaced closely enough to prevent the animal from entering the interior of the feeder. A large amount of hay is pulled outwardly through the bars by the animals with the excess hay falling onto the ground and being trampled by the livestock thereby resulting in considerable waste of the hay.

SUMMARY OF THE INVENTION

A hay saving insert is provided for a conventional livestock feeder comprising a cylindrical frame including a number of spaced-apart bars which prevent the animal from entering the frame while allowing the animal to place its head through the bars. A cylindrical frame includes a ring-shaped upper end and a ring-shaped lower end. The insert of this invention has upper and lower ends and is selectively removably positioned within the cylindrical frame. The insert includes a ring-shaped upper end portion at its upper end which is removably supported upon the ring-shaped upper end of the cylindrical frame. The insert includes a generally conical-shaped portion which extends downwardly from the ring-shaped upper end portion of the insert, into the interior of the cylindrical frame. The conical-shaped portion of the insert includes a plurality of spaced-apart bars which allow the animal to place its head therebetween to grasp the feed material therein for eating. The lower end of the insert is spaced inwardly of the lower end of the cylindrical frame to define an area therebetween into which excess feed may fall. A shield extends around the upper end of the ring-shaped upper end portion of the insert to prevent animals from accessing the feed from above and/or through the outer portion of the insert.

It is a principal object of the invention to provide a hay saver insert which is removably positioned on a conventional feeder and which extends downwardly and inwardly thereinto.

Yet another object of the invention is to provide an insert for a conventional bale feeder which prevents hay waste.

Yet another object of the invention is to provide an insert for a conventional round hay feeder which prevents spoilage of the hay therein by keeping the hay off the ground.

Yet another object of the invention is to provide a hay saving insert for a conventional round hay feeder which is positioned on and within the feeder without any modification of the feeder.

Still another object of the invention is to provide a hay saver insert of the type described above which is durable in use.

These and other objects will be apparent to those skilled in the art.

DETAILED DESCRIPTION OF THE INVENTION

Figure 1:
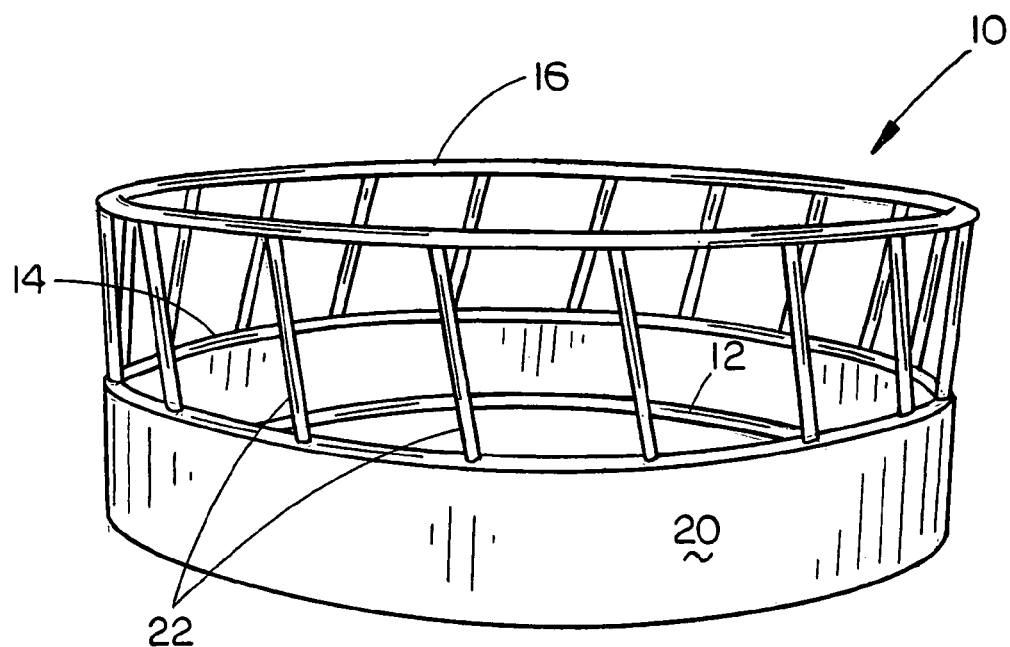
FIG. 1 is a perspective view of a conventional round prior art hay feeder.
Figure 2:
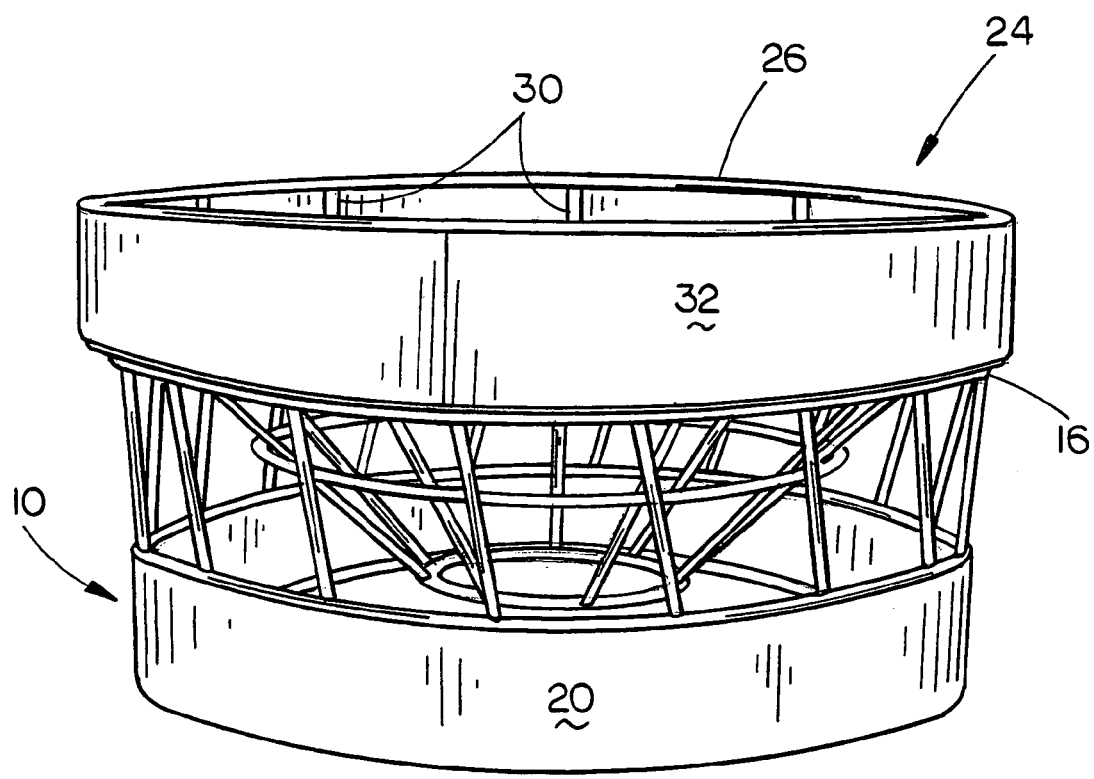
FIG. 2 is a perspective view of the hay saver insert of this invention positioned on and within the prior art feeder of FIG. 1.
Figure 3:
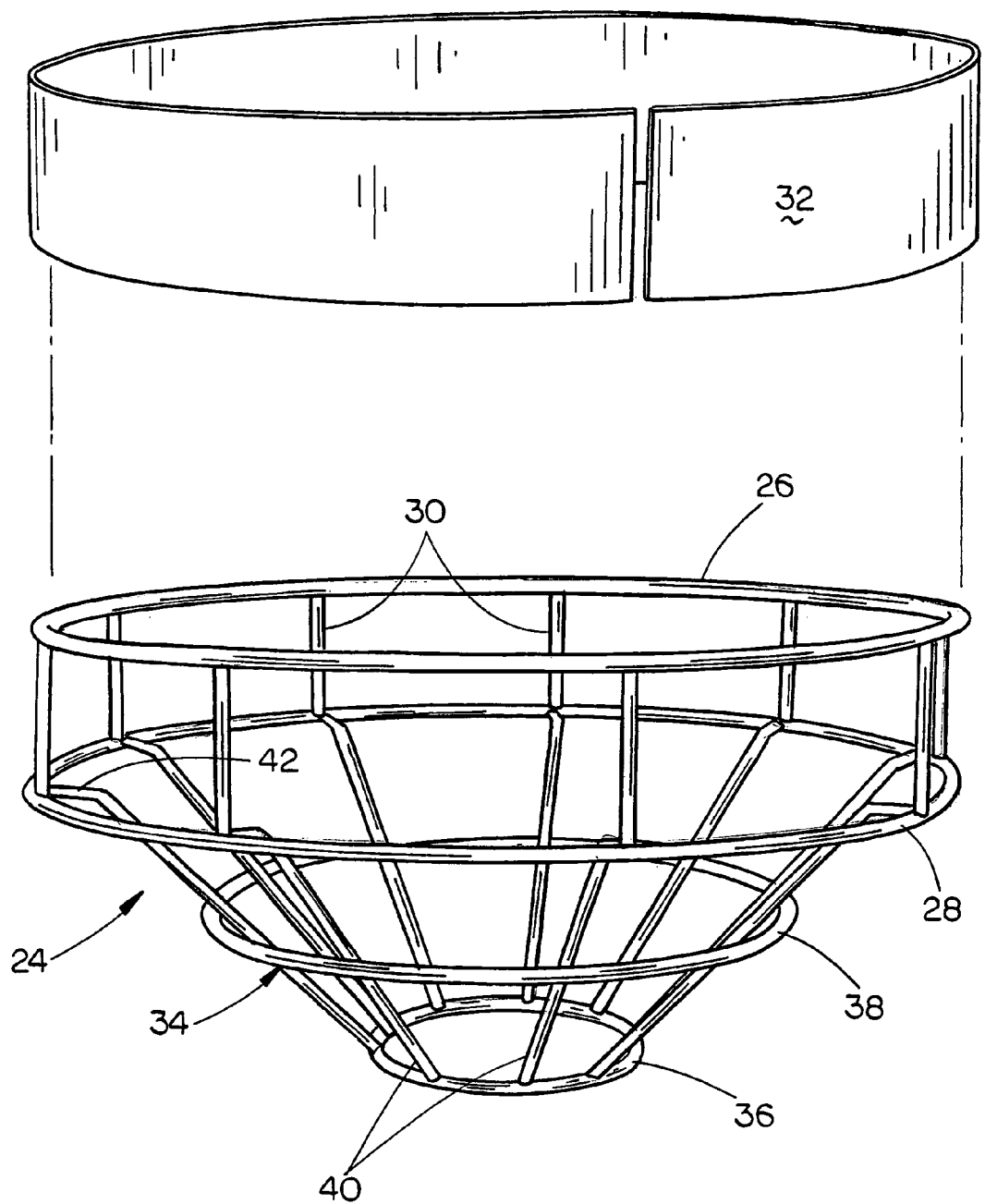
FIG. 3 is a partially exploded perspective view of the hay saver insert of this invention.
Figure 4:
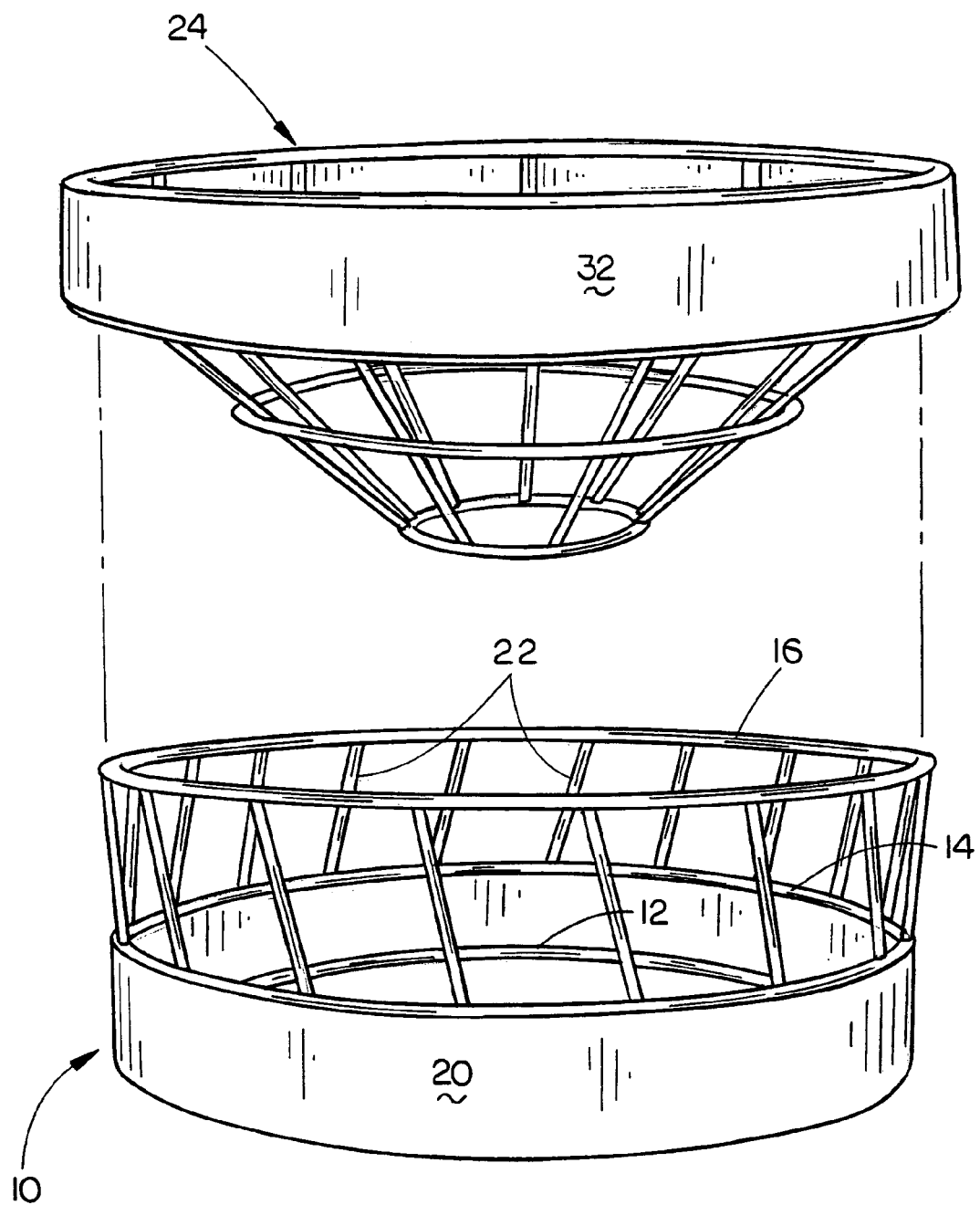
FIG. 4 is an exploded perspective view illustrating the relationship of the insert and the prior art feeder.
Figure 5:
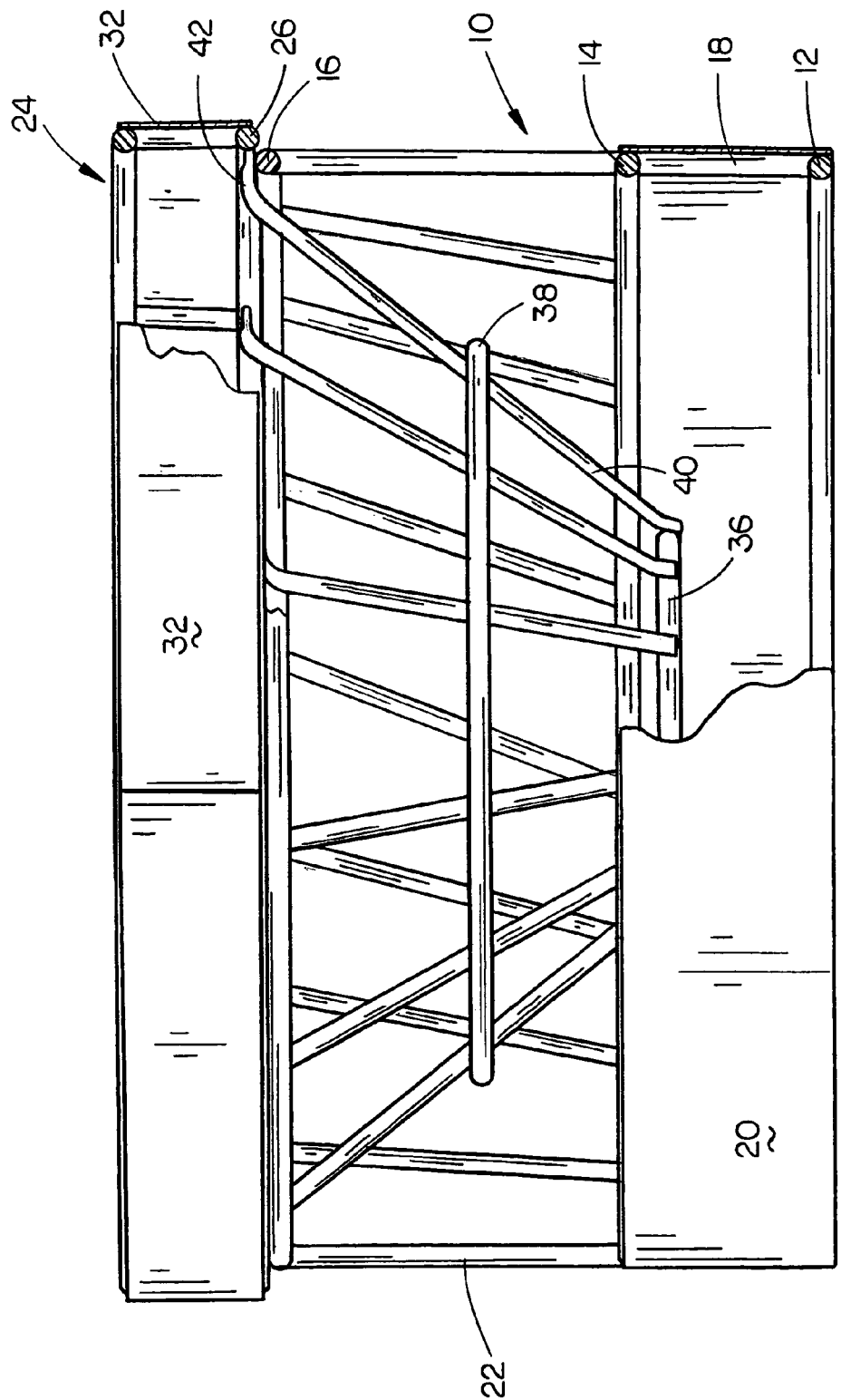
FIG. 5 is a side view of the hay saver insert mounted on the prior art hay feeder with portions thereof cut away to more fully illustrate the invention.

In the drawings, the numeral 10 refers to a conventional livestock feeder which is used to feed cylindrical hay bales placed therein to livestock. The bale feeders of the prior art are generally cylindrical or round and include a lower ring-shaped frame member 12, an intermediate ring-shaped frame member 14, and an upper ring-shaped frame member 16. In some feeders, the intermediate ring-shaped frame member 14 is omitted. In many prior art feeders, a plurality of horizontally spaced-apart bars or pipes are welded to and extend between the frame members 12 and 14. The bars are normally covered or enclosed by a shield 20 which is secured to frame members 12 and 14 and which extends therebetween to prevent hay from passing outwardly through the bars.

A plurality of spaced-apart bars or pipes 22 are welded to and extend between the frame members 14 and 16 in conventional fashion. Normally, the bars 22 are angularly disposed. The pipes 22 are sufficiently spaced-apart to permit the animal to insert its head between the bars 22 while preventing the animal from entering the interior of the feeder.

Normally, cylindrical hay bales are placed in the interior of the feeder 10. The animal extends its head and neck between the bars 22 to feed. In the feeding process, much hay falls or is pulled outwardly through the bars 22 and falls upon the ground wherein it is trampled, resulting in hay waste. Additionally, the hay in the feeder 10 rests upon the ground which may lead to spoilage of the hay which is in contact with the ground within the feeder 10.

In an effort to solve the problems of the conventional feeders 10, such as commonly used in the prior art, applicant has designed a hay saving insert 24 which is selectively removably positioned on and within a feeder such as feeder 10. Insert 24 includes a ring-shaped frame member 26 at its upper end which has a diameter slightly greater than the diameter of the feeder 10. Insert 24 also includes a ring-shaped frame member 28 positioned below frame member 26, as seen in the drawings. A plurality of horizontally spaced-apart bars or pipes 30 are secured to and extend between frame members 26 and 28. Frame member 28 normally will have a diameter which is the same as frame member 26. Shield 32 is preferably secured to the frame members 26 and 28 and extends therearound to enclose the upper end portion of the insert 24 to prevent animals from inserting their heads into the insert between the bars 30.

Insert 24 includes a generally conical-shaped portion 34 which is secured to and which extends downwardly and inwardly from frame member 28. Conical-shaped portion 34 includes a ring-shaped frame member 36 and a ring-shaped frame member 38 positioned above frame member 36. A plurality of spaced-apart bars 40 are secured at their lower ends to frame member 36 and extend upwardly and outwardly therefrom. Bars 40 are also secured to frame member 38 by welding or the like. The upper ends of each of the bars 40 have a horizontally extending portion 42 which is secured to frame member 28 by welding or the like, as seen in the drawings. The spacing of the bars 40 will depend upon the particular feeder's requirements. The insert 24 could be comprised of a two-piece or three-piece construction if so desired.

The insert 24 is designed to be used with almost any type of conventional feeder which is cylindrical or round in configuration. The insert 24 is placed within the feeder 10 with the horizontally extending portions 42 of bars 40 resting upon the upper frame member 16 of feeder 10. When the insert 24 is positioned on the feeder 10, the frame member 36 is preferably positioned above the ground to prevent feed within the insert from coming into contact with the ground, thereby preventing spoilage of the same. The diameter of frame member 36 is less than the normal diameter of a cylindrical hay bale so that the hay is supported above the ground. When the insert 24 is positioned on the feeder 10, the hay is placed within the insert and the animals have access thereto by extending their heads and necks between the bars 22 of the feeder 10 and between the bars 40 of the insert 24. As the animals pull hay from the insert 24, excess hay falls onto the ground within the area between the feeder 10 and the insert 24 which prevents the hay so falling from being trampled into the ground. The animals can eat the hay which has fallen into the area between the feeder 10 and insert 24.

Thus it can be seen that a novel hay saving insert has been provided for conventional feeders with the insert being selectively removably mounted thereon without any modification of the feeder being necessary. It can therefore be seen that the insert of this invention enables a conventional feeder to be converted into a feeder which prevents hay waste.

Thus it can be seen that the invention accomplishes at least all of its stated objectives.

What is claimed is:

1. In combination:
a livestock feeder comprising an upstanding frame including a number of bars which prevent the animal from entering the frame while allowing the animal to place its head through the bars;
said upstanding frame including an upper end and a lower end;
said bars extending downwardly from said upper end of said upstanding frame;
and a feed material receiving insert, having upper and lower ends, selectively removably positioned within said upstanding frame;
said removable insert including an upper end portion at its said upper end which is positioned at said upper end of said upstanding frame;
said removable insert also including a downwardly extending portion which extends downwardly from said upper end portion of said insert, into the interior of said upstanding frame;
said downwardly extending portion including a plurality of spaced-apart bars which allow the animal to place its head therebetween to grasp the feed material therein for eating;
said lower end of said insert being spaced inwardly of said lower end of said upstanding frame to define an area therebetween.

2. The combination of claim 1 wherein said downwardly extending portion is truncated at its said lower end.

3. The combination of claim 1 wherein said upper end portion of said insert includes a plurality of upwardly extending and horizontally spaced-apart bars.

4. The combination of claim 3 wherein a shield extends around said upwardly extending and horizontally spaced-apart bars of said insert.

5. The combination of claim 3 wherein a first frame member is secured to the upper ends of said upwardly extending and horizontally spaced-apart bars of said insert.

6. The combination of claim 5 wherein a second frame member is secured to the lower ends of said upwardly extending and horizontally spaced-apart bars.

7. The combination of claim 6 wherein said second frame member rests upon the upper end of said upstanding frame.

8. The combination of claim 7 wherein said downwardly extending portion of said insert extends inwardly and downwardly from said second frame member.

9. The combination of claim 1 wherein said downwardly extending portion of said insert has a lower end which is positioned above the lower end of said upstanding frame of said livestock feeder.

10. A feed material receiving insert for use with a livestock feeder including an upstanding frame, having an upper end and a lower end, including a number of bars which prevent the animal from entering the frame while allowing the animal to place its head through the bars, the improvement comprising:
said feed material receiving insert having upper and lower ends;
said feed material receiving insert being selectively removably positioned within the upstanding frame;
said removable insert including an upper end portion at its said upper end which is positioned at said upper end of said upstanding frame;
said removable insert also including a downwardly extending portion which extends downwardly from said upper end portion of said insert, into the interior of said upstanding frame;
said downwardly extending portion including a plurality of spaced-apart bars which allow the animal to place its head therebetween to grasp the feed material therein for eating;
said lower end of said insert being spaced inwardly of said lower end of said upstanding frame to define an area therebetween.

11. The insert of claim 10 wherein said downwardly extending portion is truncated at its said lower end.

12. The insert of claim 10 wherein said upper end portion of said insert includes a plurality of upwardly extending and horizontally spaced-apart bars.

13. The insert of claim 12 wherein a shield extends around said upwardly extending and horizontally spaced-apart bars of said insert.

14. The insert of claim 12 wherein a first frame member is secured to the upper ends of said upwardly extending and horizontally spaced-apart bars of said insert.

15. The insert of claim 14 wherein a second frame member is secured to the lower ends of said upwardly extending and horizontally spaced-apart bars.

16. The insert of claim 15 wherein said second frame member rests upon the upper end of said upstanding frame.

17. The insert of claim 16 wherein said downwardly extending portion of said insert extends inwardly and downwardly from said second frame member.

18. The insert of claim 10 wherein said downwardly extending portion of said insert has a lower end which is positioned above the lower end of said upstanding frame of said livestock feeder.

19. In combination:
- a livestock feeder comprising an upstanding frame including a number of bars which prevent the animal from entering the frame while allowing the animal to place its head through the bars;
- said upstanding frame including an upper end and a lower end;
- said bars extending downwardly from said upper end of said upstanding frame;
- and a feed material receiving insert, having upper and lower ends, selectively removably positioned within said upstanding frame;
- said removable insert including an upper end portion at its said upper end which is positioned at said upper end of said upstanding frame;
- said removable insert also including a downwardly extending portion which extends downwardly from said upper end portion of said insert, into the interior of said upstanding frame;
- said downwardly extending portion including a plurality of spaced-apart supports which allow the animal to place its head therebetween to grasp the feed material therein for eating;
- said lower end of said insert being spaced inwardly of said lower end of said upstanding frame to define an area therebetween.

20. In combination:
- a livestock feeder comprising an upstanding frame defining a plurality of spaced-apart feeding areas which prevent the animal from entering the frame while allowing the animal to place its head therethrough;
- said upstanding frame including an upper end and a lower end;
- and a feed material receiving insert, having upper and lower ends, selectively removably positioned within said upstanding frame;
- said removable insert including an upper end portion at its said upper end which is positioned at said upper end of said upstanding frame;
- said removable insert also including a downwardly extending portion which extends downwardly from said upper end portion of said insert, into the interior of said upstanding frame;
- said downwardly extending portion including a plurality of spaced-apart bars which allow the animal to place its head therebetween to grasp the feed material therein for eating;
- said lower end of said insert being spaced inwardly of said lower end of said upstanding frame to define an area therebetween.

\* \* \* \* \*